Feb. 2, 1965     E. WIEDMANN     3,168,007
RADIAL CRANK TYPE HYDRAULIC MACHINE
Filed Dec. 16, 1963     2 Sheets-Sheet 1

ERNST WIEDMANN
INVENTOR

ATTORNEY

Feb. 2, 1965   E. WIEDMANN   3,168,007
RADIAL CRANK TYPE HYDRAULIC MACHINE
Filed Dec. 16, 1963   2 Sheets-Sheet 2

ERNST WIEDMANN
INVENTOR

T. Lloyd La Fave
ATTORNEY

United States Patent Office 3,168,007
Patented Feb. 2, 1965

3,168,007
RADIAL CRANK TYPE HYDRAULIC MACHINE
Ernst Wiedmann, Oconomowoc, Wis., assignor to
The Oilgear Company, Milwaukee, Wis.
Filed Dec. 16, 1963, Ser. No. 330,850
5 Claims. (Cl. 91—176)

This invention relates to a hydraulic machine having a plurality of radially extending cylinders and producing relative rotary movement between cylinders and a crankshaft and more particularly to an improved fluid transmitting bearing shoe between each cylinder and a port sleeve on the crankshaft.

A typical hydraulic machine in which the present invention is embodied is shown and described in patent application Serial Number 271,186, filed April 8, 1963, and assigned to the assignee of this application. In this machine fluid is admitted to and returned from the radially arranged cylinders by porting through the crankpin on which is mounted a port sleeve providing cylinder ports for the radially arranged cylinders. The piston of each radially arranged cylinder is urged toward the crankpin by hydraulic pressure and holds piston bearing shoes in sealing engagement with the port sleeve on the crankshaft. A particular problem in connection with this type of machine is that of holding the piston shoe in sealing engagement with the port sleeve on the crankpin and preventing blowoff of the piston shoe from the port sleeve not only to prevent excessive leakage but to avoid resulting damage to the hydraulic machine, and associated hydraulic equipment. An additional serious problem in connection with holding the piston bearing shoe in sealing engagement with the port sleeve occurs on start up of the hydraulic machine. At such times the pressure field area between the piston bearing shoe and the port sleeve is immediately effective to cause separation of the bearing shoe from the port sleeve because the cylinder is not sufficiently filled with oil to build up pressure in the cylinder for urging of the piston towards the port sleeve.

It is an object of the present invention to provide a hydraulic machine of the type described having an improved piston bearing shoe for maintaining sealing engagement with a port sleeve.

Another object of the invention is to provide a hydraulic machine of the type described, a piston bearing therefor having a fluid pressure field divided into a first area providing for flow through the bearing shoe and a second area for providing an additional fluid bearing in which the fluid pressure is self-adjusting for maintaining the piston bearing shoe in sealing engagement with the port sleeve.

Another object of the invention is to provide a hydraulic engine having a piston bearing shoe in which the bearing face of the shoe has a flow through recess area for interconnecting the cylinder port with the cylinder and an additional area separated from the first area by a land surface portion of the bearing face so that the first flow through recess area and the additional recess area provide a pressure field for the thrust bearing so that high pressure fluid in the flow through recess area is delayed in passing to the additional recess area particularly on start up of a hydraulic machine so that the cylinder has time to fill up with pressure fluid before the pressure field on the face of the bearing is completed at flow operating pressure.

Another object of the invention is to provide a hydraulic crank type machine providing a porting through the crankpin to the cylinder and having a piston bearing shoe and a port sleeve on the crankpin for transmitting thrust as well as fluid between the cylinder and the crankpin, with the bearing shoe so constructed and arranged that it has a central flow-through area subject to the pressure in the valve port and in the cylinder and has a balance area about the central recess area which receives pressure fluid therefrom at a very limited rate to aid in preventing the blowoff of the piston shoe from the port sleeve.

Other objects and advantages of a hydraulic machine embodying the invention will be understood to one skilled in the art from the following description and accompanying drawings in which.

Figure 1:
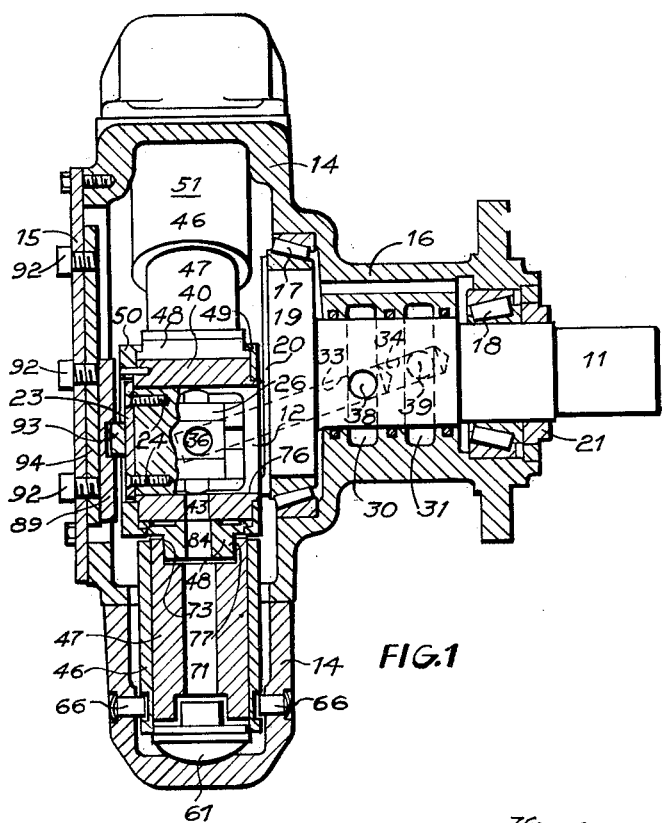
FIG. 1 is an end view in elevation of a hydraulic machine embodying the invention and shows a portion of the housing broken away and a portion of the exposed engine parts in section to show the radial arrangement of the piston and cylinder assemblies on the crankpin and to show valve means of distributing pressure fluid between the crankpin and the cylinder assemblies.

Referring to the drawings by characters of reference, the crank type hydraulic machine, FIG. 1, comprises a crankshaft 11 having a crankpin 12 whose axes are parallel to each other and spaced radially of each other to provide an eccentricity determinative of the stroke of the pistons of the machine.

A housing includes a star-shaped portion 14 and a journal housing portion 16 provided with axially spaced thrust and radial bearings 17, 18. The crankshaft 11 has an enlarged flange 19 having a shoulder 20 that abuts the lower race of bearing 17. A bearing adjusting nut 21 is secured to the outboard end of the crankshaft 11 and abuts the lower race of bearing 18 to axially secure the crankshaft within bearings 17 and 18 whose outer races oppositely abut shoulders formed in the housing.

Figure 4:
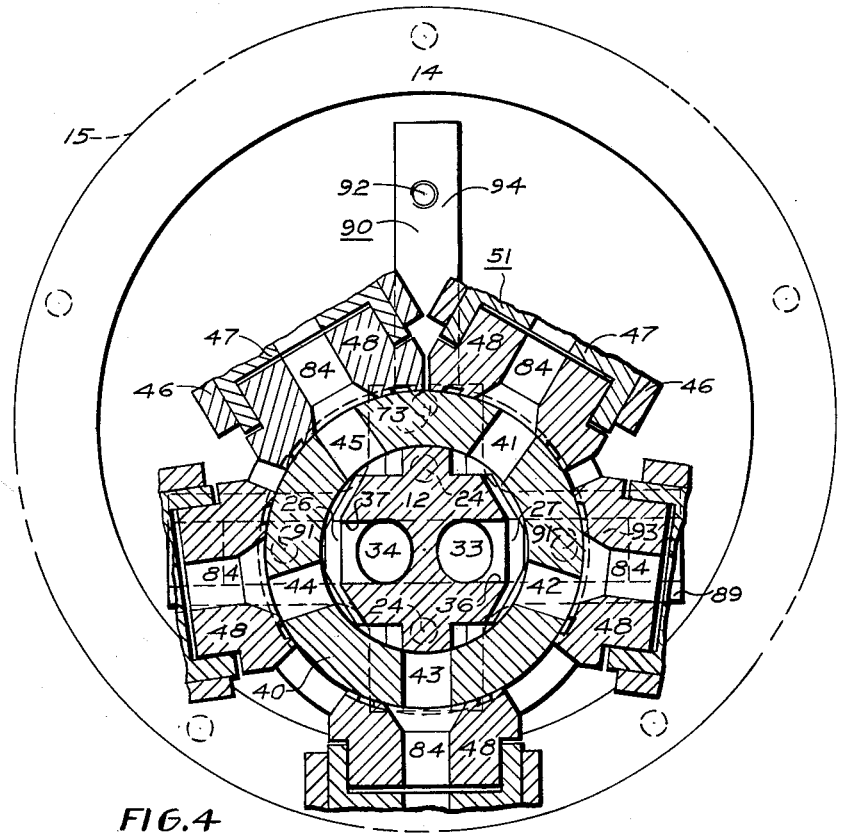
FIG. 4 is a schematic illustration of a cross-slide arrangement by which the port sleeve is secured relative to the housing and to the crankpin so that the port sleeve may follow the displacement of the crankpin while being held against rotation relative of the housing.

The crankpin 12 is a cylindrical member preferably formed integral with the crank shaft 11 and is provided with diametrically opposite valve ports 26, 27, as seen in FIG. 4, formed in the cylindrical surface of the crankpin. Machine ports, not shown, are provided in the journal housing 16 and connect with annular grooves 30, 31 in the wall of the housing which register with radial holes 38, 39, respectively, in the crankshaft, and radial holes 38, 39 connect the inclined axial passages 33, 34, respectively, in the crank shaft, which appear one above the other in FIG. 1. Inclined axial passages 33, 34 extend into the crankpin and are connected by radial holes 36, 37 to the diametrically opposite valve ports 26, 27 for the supply and discharge of motive fluid to and from working cylinders.

A port ring or port sleeve 40 is closely fitted on the crankpin 12 and is axially confined thereon by an end plate 23 secured by screws 24 to the end face of the crankpin 12. The port sleeve 40 is rotatable relative to the crankpin and is secured against rotation relative to the housing by suitable linkage means 90 which permits a translatory movement of the port sleeve in the housing upon rotation of the crankpin 12 relative to the port sleeve 40. The linkage means 90, FIG. 4, may be a cross-slide device comprising a pair of transversely disposed guide rails 93, 94 and a cross-slide member 89. Guide rail 93 is secured by screws 91 to a retaining ring 50 for the port sleeve 40 for movement therewith. Guide rail 94 is secured by screws 92, FIG. 1, to an end cover 15 for the housing 14. Cross-slide member 89 provides a guide slot for reciprocable movement of guide rail 93 therein, and has a guide slot in an opposite face in a transverse direction for sliding on guide rail 94.

The port sleeve 40 has five radial holes which serve as cylinder ports 41 through 45 in constant communication with five radially arranged cylinders 46 in the star-shaped housing 14. Each cylinder port 41 through 45 alternately registers with the valve ports 26, 27 upon rotation of the crankpin relative to port sleeve 40 and the housing.

Five piston-cylinder assemblies 51 are supported in the star-shaped housing 14 and each includes a cylinder 46, a piston 47, and a piston shoe or bearing shoe 48 supported on the end of the piston for transmitting radial thrust between the piston and the port sleeve 40. The bearing shoes 48 are retained on the port sleeve by a pair of retainer rings 49, 50 which permit circumferential oscillatory movement of the shoes on the port sleeve and a slight wobble movement transversely of the oscillatory movement for alignment thereon.

Cylinder 46 is closed at its radially outer end by a spherical headed plug 61 seated in a mating surface of housing 14. Rocker pins 66 provide a further pivot means for the cylinder for retaining it within the housing 14. Piston 47, disposed for reciprocable movement in cylinder 46, is a hollow piston for conducting motive fluid to and from the cylinder 46.

Figure 2:
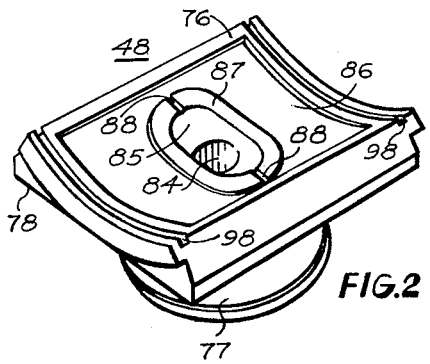
FIG. 2 is an asymmetric view of a bearing shoe for a piston of the machine of FIG. 1 to show the construction of the bearing face of the shoe.

Each bearing shoe 48 is generally rectangular, FIGS. 1 and 2, with a concave cylindrical bearing surface 76 which seats on the cylindrical surface of the port sleeve 40. A cylindrical shaped stud portion 77 is fitted in a counterbore 73 in a radially inner end of the piston 47, and a shoulder 78 of the bearing shoe abuts an end surface of the piston for limited rocking movement thereon in a plane transverse to normal swinging movement of the piston-cylinder assemblies. The bearing shoe is secured by rocker pins, not shown, to the piston 47 for rocking movement of the shoes for proper seating of the bearing shoe longitudinally of the port sleeve.

The bearing shoe 48 has a central bore 84 extending through the cylindrical stud portion 77 for conducting motive fluid through the bearing shoe. A central pocket or recess 85 is formed in the face of the bearing open to central bore 84 so that central recess 85 is a flow-through recess that provides part of a fluid bearing in the bearing face. A dam or land 87 surrounds the central recess 85 and provides part of the bearing surface in engagement with the port sleeve 40, and is accordingly a cylindrically concave surface. Bearing shoe 48, FIG. 2, has a balance area recess 86 that is enclosed by the outer land areas of the bearing face.

Flow-through recess 85 is elongated in the direction of oscillatory movement of the bearing shoe so that within the range of such movement the recess 85 is in communication with the corresponding cylinder port in the port sleeve for rated flow therethrough. The balance area recess 86 is a relatively large area and receives pressure fluid from the central recess 85 at a limited flow rate across the face of the land 87 and as shown through the limited flow passage means provided by the narrow slots 88 which extend across the land 87 and preferably in the direction of shoe movement on the port sleeve 40 to benefit from a self-cleaning wiping action provided thereby.

The boundary surface 76 of the bearing shoe, on its axially outer sides relative to port sleeve 40, is shown interrupted by a pair of grooves 98 which extend circumferentially across the face of the boundary area land surfaces to serve as drain grooves which limit the bearing area to a predetermined maximum pressure area slightly less than the hold-down area provided by the piston so that there is always a positive net hold-down force preventing separation of the bearing shoe from the port sleeve 40.

Rotation of the crankshaft 11 causes the crankpin 12 to crank and displace the pistons 47 in their cylinders 46 because the piston-cylinder assemblies are secured in the star-shaped housing at points in a circle that is coaxial of the crankshaft. The free ends of the piston-cylinder assemblies are in sliding engagement on the port sleeve 40 and must slide thereon as the piston-cylinder assemblies swing in oscillatory movement in order that they remain in radial alignment with the crankpin 12.

The bearing shoe 48 has a bearing face that provides a pressure field area that results in separation forces between the bearing shoe and the port sleeve that is normally slightly less than the hold-down forces resulting from the hold-down area of its working piston 47 so that land surfaces of the shoe are lubricated by oil film and are held in sealing engagement with the cylindrical surface of the port sleeve about the corresponding cylinder port therein. The construction of the bearing faces with a balance area recess 86 in addition to a flow-through recess 85 with a limited rate of fluid flow therebetween assists in preventing separation of the bearing shoe from the port sleeve because the pressure in the balance area recess tends to be self-adjusting.

The limited rate of flow provided from the flow-through recess 85 to the balance area recess 86 is, moreover, particularly advantageous on start-up of the hydraulic machine by permitting the fluid in the associated cylinder 46 to reach normal compression values before the balance area 86 of the bearing shoe is subject to the higher pressures. The arrangement prevents the separation forces from exceeding the hold-down forces on start-up of the hydraulic machine.

In the machine shown, when idle and not under pressure, a lower piston tends to fall away from the port sleeve by the force of gravity and the clearance therebetween permitted by the bearing shoe retainer rings 49, 50 would if maintained after start-up be excessive and make the piston inoperative as a working piston for loss of pressure fluid therethrough would be excessive. The construction of the bearing face with a relatively small central flow-through recess area surrounded by land surfaces tends to interrupt the flow of fluid across the face of the bearing shoe and thereby assists in the build-up of pressure in the associated cylinder 46 so that the bearing shoe immediately is urged against the port sleeve 40; and once having seated thereon, the bearing face further assists in maintaining itself seated because of the limited rate of flow then possible across the face of the bearing shoe. Even in adjusting itself on the port sleeve wherein self-tilting of the bearing shoe may occur, the self-regulating pressure of the large balance area 86 prevents blow-off and full separation of the bearing shoe from the port sleeve 40.

In start-up and in operation of the hydraulic machine, pressure fluid is supplied via valve port 26 to working cylinders 46 in communication therewith. Such pressure fluid admitted to cylinders 46 urges the corresponding pistons 47 toward the crankpin thereby holding their bearing shoes in sealing engagement with the port sleeve and in flow communication with each of their associated cylinder ports in the port sleeve. Radial thrust is exerted by the pistons against the crankpin causing it to turn in one direction about the axis of the crankshaft 11 and resulting in each cylinder port alternately registering with the pressure valve port 26 and the fluid return valve port 27. The pistons 47 whose cylinders 46 are connected to the return valve port 27 are also urged by a low positive value of pressure in the return line toward the crankpin 12 so as to maintain their bearing shoes in fluid sealing engagement with the port sleeve 40 and the piston-cylinder assemblies in radial alignment therewith.

Figure 3:
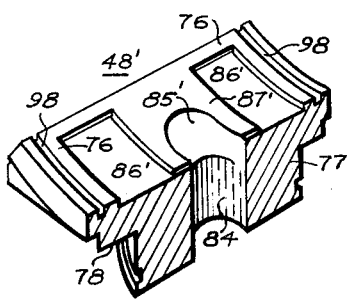
FIG. 3 is another asymmetric view of a half section of a modified bearing face for a bearing shoe like that shown in FIG. 2.

FIG. 3 shows another bearing shoe 48′ whose bearing face is modified from that of the bearing shoe 48. Bearing shoe 48′ has a bearing face with a central flow-through recess 85' and on opposite sides thereof balance area recesses 86' separated by an intermediate land surface 87' that extends circumferentially across the concave face of the bearing shoe but includes therein the central flow-through recess 85'. Balance area recesses 86' are also supplied with fluid from the central area recess 85' at a limited flow rate which may be provided by flow restriction passages therebetween but is shown without specific flow restriction passages and depends on a limited rate of flow across the bearing surface of separating land 87'.

Figure 5:
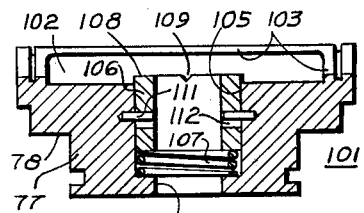
FIGS. 5 and 6 are transverse half sections of another bearing shoe for a working piston of the machine of FIG. 1.
Figure 6:
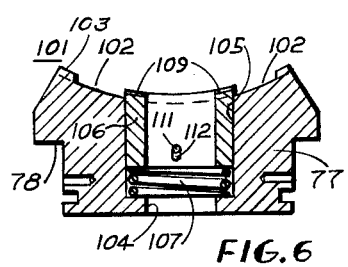

FIGS. 5 and 6 show another bearing shoe 101, in lieu of bearing shoe 48 on the piston 47 of the machine of FIG. 1. Bearing shoe 101 has a concave cylindrical surface having a large recess area 102 defined by boundary lands 103 adapted to make fluid sealing engagement with the port sleeve 40. The cylindrical stud portion 77 of the bearing shoe is adapted to be received by the end of a working piston 47, and a central bore 104 therethrough is adapted to provide a flow-through passage in alignment with a passage 71 through the piston 47. Bore 104 leads to a counterbore 105 that receives a flow-through sealing piston 106 and a spring 107 disposed between piston 106 and a shoulder formed by the counterbore so that the spring under the piston 106 urges the piston outward against the port sleeve 40.

The outer end surface 108 of sealing piston 106 extends into recess area 102 and is concave cylindrically to form a part of the bearing face of the bearing shoe 101. The outer end 108 serves as a land between the recess area 102 and a central flow-through area provided by the piston 106. Recess area 102 serves as a balance area that receives pressure fluid across the end 108 of the piston 106 at a limited flow rate since the piston 106 abuts the surface of the port sleeve. The end 108 of the piston 106 may, as shown, be provided with a narrow flow restricting slot 109 for admitting fluid to the balance area 102 at a limited rate.

The piston 106 is secured against rotation in the counterbore 105 of the bearing shoe but permitted limited axial movement therein by means of a pin 111 press fitted into a hole in the wall of the counterbore 105 and projecting into an elongated hole 112 in the piston 106.

In operation of the machine, the bearing shoe 101 has its sealing piston 106 always urged into contact with the port sleeve 40 by the force of the spring 107, and when fluid pressure is supplied through a cylinder port 41, 42, 43, 44, or 45 of port sleeve 40, such fluid pressure effectively acts to aid the spring 107 in urging the piston 106 against the port sleeve until the pressure in recess area 102 has reached normal compression value. The rate of build up of pressure in recess area 102 on the face of the bearing is delayed with respect to the build up of compression in the working cylinder 46 and the bearing shoe therefore does not tend to separate from the port sleeve during startup of the machine or during operation.

It should be noted that the end of sealing piston is of a size normally maintaining sealing engagement with the surface of the port sleeve bounding a cylinder port, that the opening provided by the end of the sealing piston is not elongated but is sufficiently large to maintain constant communication with the corresponding cylinder port. A portion of the area, however, of the cylinder port opening is cut off by the end of the sealing piston only when rated flow is not required therethrough.

While but few modifications embodying the invention have been shown, and described, changes and other modifications may be made therein within the spirit of the invention and the scope of the following claims.

I claim:

1. A flow-through bearing for a crank type of hydraulic machine having a valve sleeve journalled on a crank for valving motive fluid between the crank and a radially arranged piston and cylinder unit swingably supported so as to remain in radial alignment with the crank, said flow-through bearing adapted to transmit thrust and conduct motive fluid between the valve sleeve and the piston and cylinder unit and adapted to be urged by hydrostatic forces into sealing engagement with the valve sleeve, said flow-through bearing having a concave cylindrical bearing surface with a central recess open to a flow-through passage and wherein the central recess is of minimum area for maintaining registration with a cylinder port in the valve sleeve, and said flow-through bearing also having a balance area recess in its bearing surface with a land spacing the central flow-through recess from the balance area recess, whereby the bearing surface cooperates with the surface of the valve sleeve and a port therein to conduct motive fluid through the bearing and to limit the rate of flow of pressure fluid from the central flow-through recess in the face of the bearing to the balance area recess therein, so that hydrostatic forces expanding the piston and cylinder unit overcome the hydrostatic forces tending to separate the flow-through bearing from the valve sleeve, particularly on start-up of the hydraulic machine.

2. A flow-through bearing as defined in claim 1 in which the land between the central flow-through recess and the balance area recess is provided with a flow restricting passage between said recesses.

3. A flow-through bearing as defined in claim 1 in which the bearing face has a balance area recess on each side of the central flow-through recess separated by the land therebetween.

4. A flow-through bearing as defined in claim 1 in which the central flow-through recess is provided by a hollow piston fitted in the bearing shoe and urged toward the bearing surface so that the end of said hollow piston forms a land restricting the flow of pressure fluid to the balance area recess.

5. A flow-through bearing for a crank type of hydraulic machine having a valve sleeve journalled on a crank for valving motive fluid between the crank and a radially arranged piston and cylinder unit, said flow-through bearing comprising:

a flow-through passage for freely conducting motive fluid between a cylinder port in the valve sleeve and an expansion chamber in the piston and cylinder unit whereby hydrostatic forces therein urge the bearing shoe into sealing engagement with the valve sleeve, a concave cylindrical bearing face having a large recess area formed therein, a flow-through hollow piston disposed in a bore in the flow-through bearing in alignment with the flow-through passage and having a concave cylindrical end surface for mating engagement with the valve sleeve, spring means urging the flow-through piston toward the bearing surface so that when in mating engagement with the valve sleeve hydrostatic forces acting on the flow-through piston urge it into sealing engagement with the valve sleeve, a flow restricting passage in the outer end of the flow-through piston for interconnecting the flow-through passage with the large recess area in the bearing surface which serves as a balance area whose pressure rises at a limited rate to prevent separation of the bearing from the valve sleeve.

References Cited by the Examiner
UNITED STATES PATENTS

| 2,968,287 | 1/61 | Creighton | 92—156 |
|---|---|---|---|
| 3,030,932 | 4/62 | Muller | 91—180 |
| 3,036,557 | 5/62 | Kinsey | 91—176 |
| 3,040,716 | 6/62 | Hahn | 91—176 |

FRED E. ENGELTHALER, *Primary Examiner.*